United States Patent
Yasumuro et al.

(10) Patent No.: US 8,343,561 B2
(45) Date of Patent: Jan. 1, 2013

(54) PACKAGE FOR COOKING BY MICROWAVE OVEN

(75) Inventors: Hisakazu Yasumuro, Kanagawa (JP); Shinji Tanaka, Kanagawa (JP); Kikuo Matsuoka, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 697 days.

(21) Appl. No.: 12/301,389

(22) PCT Filed: Apr. 17, 2007

(86) PCT No.: PCT/JP2007/058323
§ 371 (c)(1),
(2), (4) Date: Jan. 15, 2009

(87) PCT Pub. No.: WO2007/135824
PCT Pub. Date: Nov. 29, 2007

(65) Prior Publication Data
US 2009/0110785 A1    Apr. 30, 2009

(30) Foreign Application Priority Data
May 19, 2006  (JP) .................................. 2006-139701

(51) Int. Cl.
*A21D 10/02*    (2006.01)

(52) U.S. Cl. ........ 426/107; 426/118; 426/234; 426/243; 426/113; 219/735; 220/203.01

(58) Field of Classification Search .......... 426/106–107, 426/118, 234, 113, 395–396, 412; 220/366.1, 220/360, 364, 913, 202, 203.01, 203.02, 220/203.08, 203.11, 203.15–203.16, 367.1, 220/361, 745; 206/550; 229/120; 428/34.2, 428/34.3, 35.2, 35.7
See application file for complete search history.

(56) References Cited

U.S. PATENT DOCUMENTS

| | | | | |
|---|---|---|---|---|
| 4,834,247 | A | * | 5/1989 | Oshima et al. ................ 426/107 |
| 6,847,022 | B2 | * | 1/2005 | Hopkins, Sr. ................ 219/735 |

FOREIGN PATENT DOCUMENTS

| | | |
|---|---|---|
| DE | 198 60 473 A1 | 6/2000 |
| GB | 2 188 520 A | 9/1987 |
| JP | 62-235080 A | 10/1987 |
| JP | 10-236542 A | 9/1998 |
| JP | 11-171261 A | 6/1999 |
| JP | 2000-62858 A | 2/2000 |
| JP | 2001-315863 A | 11/2001 |
| JP | 2001-328686 A | 11/2001 |
| JP | 2005-41557 A | 2/2005 |
| JP | 2005-313914 A | 11/2005 |
| JP | 2006-96367 A | 4/2006 |

* cited by examiner

*Primary Examiner* — Drew Becker
*Assistant Examiner* — Luana Z Long
(74) *Attorney, Agent, or Firm* — Sughrue Mion, PLLC (57) ABSTRACT

Provided is a package for cooking in a microwave oven, in which a synthetic resin container body having a flange part is filled with contents and a lid is heat-sealed to the flange part to seal the package hermetically. Independent concave parts sandwiching a heat-sealed part are provided in a part of the flange part on the inner and outer sides of the heat-sealed part to form, on the heat-sealed part, a projection part directed to the inner direction of the container and serving as a steam releasing part by automatically opening. The package is prevented from being broken or deformed by preventing the heat-sealed part from being peeled immediately after the contents are placed in the container body. When heating cooking is performed in a microwave oven, the package improves the taste of the contents by the steaming effect. The lid is sure to automatically open by the increase of the pressure in the container.

9 Claims, 5 Drawing Sheets

PACKAGE FOR COOKING BY MICROWAVE OVEN

TECHNICAL FIELD

The present invention relates to a package for cooking in a microwave oven in which a container body made of a synthetic resin and having a flange part is filled with food such as rice and which is sealed by heat-sealing a lid to the flange part.

BACKGROUND ART

Hitherto, there have been known various packages for cooking in a microwave oven, in which retort food, frozen food, or the like is contained in synthetic resin containers to be sealed, and heated in the microwave oven to cook the contained products at the time of eating. However, when those packages are heated in the microwave oven, inside pressure of the packages is increased by steam and the like generated from the food contained therein, the packages explode, and the food may be scattered. As a result, the inside of the microwave oven becomes a mess, and harm such as a scald may be inflicted on the human body.

Therefore, before the above-mentioned package is heated for cooking in the microwave oven, the package is partially unsealed or a hole is produced in the package to discharge steam and the like, which are generated in the package, to an outside thereof so as to prevent explosion of the package.

However, the above-mentioned method requires care to an ordinary consumer. Because steam generated from the food inside the package by heating in the microwave oven is discharged to the outside of the package immediately, the package has a disadvantage in that the effect of heating and steaming the food by steam lowers, and the taste of the food become worse.

In order to solve the above-mentioned problem, various packages for cooking in a microwave oven have been proposed, in which when a container made of a synthetic resin and having a flange part is filled with food and a lid is heat-sealed to the flange part, a projection part that projects in an inward direction of the container is formed at a heat-sealed part. Those packages are prevented from exploding by allowing the projection part to be automatically opened due to the increase in inside pressure in the container in heating/cooking in a microwave oven. (For example, see Patent Documents 1-3)

Patent Document 1: JP Sho 62-235080 A
Patent Document 2: JP Hei 11-171261 A
Patent Document 3: JP 2000-62858 A However, in those packages, when the container is filled with contents such as rice, and heat-sealed to form the projection part that automatically opens, a sealing tool may be displaced from a predetermined part of the container, with the result that the projection part may be displaced from the predetermined position. Consequently, the stress generated inside the container is unlikely to be concentrated at the projection part in heating/cooking in a microwave oven, and a sealed part other than the projection part may open. Further, the package is opened earlier than a predetermined time, with the result that an effect of improving a taste of the contents through a steaming effect decreases.

Further, because the lid adheres to the container body immediately after the container automatically opens and steam is released in heating/cooking in a microwave oven, it becomes difficult to take outside air into the container rapidly. Consequently, the package is deformed Largely, resulting in being difficult to take out the contents cooked by heating.

Further, in the case where the contents such as rice adhere to the heat-sealed part between the lid and the flange part at a time of filling of the contents, it is difficult to remove the adhered contents in a conventional package due to a flat periphery of the heat-sealed part. Consequently, the heat-sealed part peels immediately after the filling of the contents or at a time of distribution of the package, whereby leaking out of the contents or the like may occur.

DISCLOSURE OF THE INVENTION

Problems to be Solved by the Invention

Thus, the present invention solves the problems associated with the above-mentioned package for cooking in a microwave oven, which is filled with contents and hermetically sealed, and an object of the present invention is to provide a package for cooking in a microwave oven that can prevent the peeling of the package at a heat-sealed part immediately after the filling of the contents and can prevent the explosion and the deformation of the package. Another object of the present invention is to provide at a low cost a package for cooking in a microwave oven, in which taste of contents is improved through a steaming effect in heating/cooking in a microwave oven, and a lid automatically opens without fail due to the increase in the inside pressure in a container.

Means for Solving the Problems

According to the present invention, in order to solve the above-mentioned problems, the following constitutions 1 to 8 are adopted.

1. A package for cooking in a microwave oven in which a container body made of a synthetic resin and having a flange part is filled with contents, and a lid is heat-sealed to the flange part to seal the package hermetically, wherein concave parts independent from each other are provided in a portion of the flange part, sandwiching a heat-sealed part, on an inner side and an outer side of the heat-sealed part, thereby forming a projection part directed in an inward direction of a container at the heat-sealed part.
2. A package for cooking in a microwave oven according to the item 1, in which an opening part projecting in an outward direction of the container is formed at a position opposed to the projection part of the heat-sealed part of the package for cooking in a microwave oven.
3. A package for cooking in a microwave oven according to the item 1 or 2, in which the container body made of a synthetic resin is a square container, and the projection part and the opening part are formed respectively in corner portions opposed to each other in the container.
4. A package for cooking in a microwave oven according to any one of the items 1 to 3, in which the projection part is formed in a U-shape or a V-shape.
5. A package for cooking in a microwave oven according to any one of the items 1 to 4, in which the opening part is formed in a V-shape.
6. A package for cooking in a microwave oven according to any one of the items 1 to 5, in which a seal strength at the projection part formed at the heat-sealed part is 5 to 30 N/15 mm.
7. A package for cooking in a microwave oven according to any one of the items 1 to 6, in which depths of the concave parts at both sides of the projection part are 0.05 to 3 mm.
8. A package for cooking in a microwave oven according to any one of the items 1 to 7, in which a width of the heat-sealed part at the projection part is 0.5 to 5 mm.

Effects of the Invention

According to the present invention, concave parts independent from each other are provided in a portion of a flange part, sandwiching the heat-sealed part, on an inner side and an outer side of the heat-sealed part, whereby the projection part directed to an inward direction of a container is formed at the heat-sealed part. Thus, when a lid is heat-sealed to the flange part of the container made of a synthetic resin and filled with contents, a sealing tool and the container can be prevented from being displaced. Consequently, the peeling of the heat-sealed part of a package immediately after the filling of the contents can be prevented, and the explosion and the deformation of the package can be prevented. Further, a package for cooking in the microwave oven can be manufactured at a low cost, in which the taste of the contents can be improved due to a steaming effect in heating/cooking of the package in the microwave oven, and in addition, the lid automatically opens from the projection part due to the increase in a pressure in the container.

DESCRIPTION OF SYMBOLS

| | |
|---|---|
| 1, 11, 21, 31 | package for cooking in a microwave oven |
| 2 | flange part |
| 3 | container body |
| 4 | lid |
| 5 | heat-sealed part |
| 6, 7 | concave part |
| 8 | projection part |
| 9 | opening part |
| 10 | sealing tool |
| 32, 33 | wide part |

BEST MODE FOR CARRYING OUT THE INVENTION

As the material constituting the container body and lid of the package for cooking by an microwave oven of the present invention, a plastic material having heat sealability which is generally used for the manufacture of a packaging container is used. The plastic material is, for example, a single-layer film or sheet made of a thermoplastic resin having heat sealability, and a multi-layer film or sheet made of a thermoplastic resin having heat sealability laminated with another thermoplastic resin.

Examples of the plastic material having heat sealability include known olefin-based resins such as low-density polyethylene, linear low-density polyethylene, medium-density polyethylene, high-density polyethylene, polypropylene, propylene-ethylene copolymer, ethylene-vinyl acetate copolymer and olefin resins graft-modified by an ethylene-based unsaturated carboxylic acid or anhydride thereof; polyamide and copolyamide resins having a relatively low melting point or a low softening point; polyester and copolyester resins; and polycarbonate resins.

Examples of the another plastic material to be laminated with the plastic material having heat sealability include thermoplastic resins having or not having heat sealability, various barrier films and oxygen absorbing resins.

Examples of such a thermoplastic resin include: polyolefins such as crystalline polypropylene, crystalline propylene/ethylene copolymer, crystalline polybutene-1, crystalline poly4-methylpentene-1, low-, medium-, or high-density polyethylene, ethylene/vinyl acetate copolymer (EVA), EVA saponified product, ethylene/ethyl acrylate copolymer (EEA), and ion crosslinked olefin copolymer (ionomer); aromatic vinyl copolymers such as polystyrene or styrene/butadiene copolymer; halogenated vinyl polymers such as polyvinyl chloride or vinylidene chloride resin; polyacrylic resins; nitrile polymers such as acrylonitrile/styrene copolymer or acrylonitrile/styrene/butadiene copolymer; polyesters such as polyethylene terephthalate and polytetramethylene terephthalate; polyamides such as 6-nylon, 12-nylon, and metaxylene diamine (MX) nylon; various polycarbonates; fluorine-based resins; and polyacetals such as polyoxymethylene. One kind of thermoplastic resin may be used alone, or two or more kinds thereof may be blended and used. Further, the thermoplastic resin may be used by mixing various additives.

All films made of a known thermoplastic resin having oxygen barrier properties may be used as the barrier films. Examples of the resin include ethylene-vinyl alcohol copolymers, polyamides, polyvinylidene chloride-based resins, polyvinyl alcohols and fluororesins. A resin not containing chlorine, which may not generate harmful gas, when the resin is burnt, is preferably used.

The particularly preferred oxygen barrier resin is a copolymer saponified product obtained by saponifying an ethylene-vinyl acetate copolymer having an ethylene content of 20 to 60 mol %, specifically 25 to 50 mol % to a saponification degree of 96 mol % or more, specifically 99 mol % or more.

Other preferred oxygen barrier resins include polyamides having 5 to 50 amido groups, specifically 6 to 20 amido groups based on 100 carbon atoms such as nylon 6, nylon 6, 6, nylon 6/6, 6 copolymer, metaxylylene adipamide (MX6), nylon 6,10, nylon 11, nylon 12, and nylon 13.

Examples of other barrier films include: a silica vapor deposited polyester film, an alumina vapor deposited polyester film, a silica vapor deposited nylon film, an alumina vapor deposited nylon film, an alumina vapor deposited polypropylene film, a carbon vapor deposited polyester film, a carbon vapor deposited nylon film; a co-vapor deposited film prepared through co-vapor deposition of alumina and silica on a base film such as a polyester film or a nylon film; a co-extruded film such as a nylon 6/metaxylene diamine nylon 6 co-extruded film or a propylene/ethylene vinyl alcohol copolymer co-extruded film; an organic resin-coated film such as a polyvinyl alcohol-coated polypropylene film, a polyvinyl alcohol-coated polyester film, a polyvinyl alcohol-coated nylon film, a polyacrylic resin-coated polyester film, a polyacrylic resin-coated nylon film, a polyacrylic resin-coated polypropylene film, a polyglycolic acid resin-coated polyester film, a polyglycolic acid resin-coated nylon film, or a polyglycolic acid resin-coated polypropylene film; and a film prepared by coating a hybrid coating material formed of an organic resin material and an inorganic material on a base film such as a polyester film, a nylon film, or a polypropylene film. One kind of barrier film may be used alone, or two or more kinds thereof may be used in combination.

A resin having an oxygen absorbable property may employ (1) a resin having oxygen absorbing property itself or (2) a resin composition containing an oxygen absorber in a thermoplastic resin having or not having oxygen absorbing property. The thermoplastic resin used for forming the oxygen absorbable resin composition (2) is not particularly limited, and a thermoplastic resin having oxygen barrier property or a thermoplastic resin having no oxygen barrier property may be used. Use of a resin having oxygen absorbing property or oxygen barrier property itself for the thermoplastic resin used for forming the resin composition (2) is preferred because intrusion of oxygen into the container may be effectively prevented by combination with an oxygen absorbing effect of the oxygen absorber.

An example of the resin having oxygen absorbing property itself is a resin utilizing an oxidation reaction of the resin. Examples of such a material include an oxidative organic material such as polybutadiene, polyisoprene, polypropylene, ethylene/carbon monoxide copolymer, or polyamides such as 6-nylon, 12-nylon, or metaxylene diamine (MX) nylon having organic acid salts each containing a transition metal such as cobalt, rhodium, or copper as an oxidation catalyst or a photosensitizer such as benzophenone, acetophenone, or chloroketones added. In the case where the oxygen absorbing material is used, high energy rays such as UV rays or electron rays may be emitted, to thereby develop further oxygen absorbing effects.

Any oxygen absorbers conventionally used for such applications can be used as an oxygen absorber to be mixed into a thermoplastic resin. A preferred oxygen absorber is generally reductive and substantially insoluble in water. Appropriate examples thereof include: metal powder having reducing power such as reductive iron, reductive zinc, or reductive tin powder; a lower metal oxide such as FeO or $Fe_3O_4$; and a reductive metal compound containing as a main component one or two or more kinds of iron carbide, ferrosilicon, iron carbonyl, and iron hydroxide in combination. An example of a particularly preferred oxygen absorber is reductive iron such as reductive iron obtained by reducing iron oxide obtained in a production process of steel, pulverizing produced sponge iron, and conducting finish reduction in a hydrogen gas or a decomposed ammonia gas. Another example thereof is reductive iron obtained by electrolytically depositing iron from an aqueous solution of iron chloride obtained in a pickling step during steel production, pulverizing the resultant, and conducting finish reduction.

As required, the oxygen absorber may be used in combination with: an oxidation accelerator formed of an electrolyte such as a hydroxide, carbonate, sulfite, thiosulfate, tribasic phosphate, dibasic phosphate, organic acid salt, or halide of an alkali metal or alkali earth metal; and an assistant such as active carbon, active alumina, or active clay. Particularly preferred examples of the oxygen accelerator include sodium chloride, calcium chloride, and a combination thereof.

In the case where reductive iron and the oxidation accelerator are used in combination, a mixing amount thereof is preferably 99 to 80 parts by weight of reductive iron and 1 to 20 parts by weight of oxidation accelerator, in particular, 98 to 90 parts by weight of reductive iron and 2 to 10 parts by weight of oxidation accelerator with respect to 100 parts by weight in total.

Another example of the oxygen absorber is a polymer compound having a polyhydric phenol in a skeleton such as a phenol/aldehyde resin having a polyhydric phenol. Further, ascorbic acid, erysorbic acid, tocophenols, and salts thereof which are water-soluble substances may appropriately be used. Of oxygen absorbable substances, reductive iron and an ascorbic acid-based compound are particularly preferred.

Further, a thermoplastic resin may contain the resin having oxygen absorbing property itself as an oxygen absorber.

The oxygen absorber preferably has an average particle size of generally 50 μm or less, and particularly preferably 30 μm or less. In the case where the package requires transparency or translucency, an oxygen absorber having an average particle size of preferably 10 μm or less, and particularly preferably 5 μm or less is used. The oxygen absorber is preferably mixed into the resin in a ratio of preferably 1 to 70 wt %, and particularly preferably 5 to 30 wt %.

The contents such as rice filling the container of the present invention are degraded due to miscellaneous germs, mold, and oxygen, and the taste thereof is likely to decrease. Thus, in the present invention, it is preferred that a laminate with a multi-layered structure containing various barrier films and an oxygen absorbing resin layer be used as a material constituting the container body and the lid. An adhesive layer can be interposed, if required, between the respective layers constituting the laminate. There is no particular limit to such an adhesive, and, for example, any of general adhesives for a laminate, such as a polyolefin-based adhesive modified with an acid anhydride such as maleic anhydride and a polyurethane-based adhesive can be used.

The preferred layer structure of the laminate constituting the container body includes: polypropylene (PP), an adhesive, a gas barrier resin such as a saponified product of an ethylene-vinyl acetate copolymer (EVOH), an adhesive, and PP; and PP, an adhesive, EVOH, an adhesive, oxygen absorbing resin layer (for example, polyolefin containing reducing iron and an oxidation accelerator), and PP; in the order from the exterior side of the container.

The preferred layer structure of the laminate constituting the lid includes: nylon (NY), EVOH, and PP/polyethylene (PE)-based composite material; NY, EVOH, and linear low-density polyethylene (LLDPE); vapor deposited polyethylene terephthalate (PET), NY, and PP/PE-based composite material; vapor deposited PET, NY, and LLDPE; and vapor deposited PET, NY, and polybutylene terephthalate (PBT)-based resin; from the exterior side of the lid.

Next, a specific example of a package for cooking in a microwave oven of the present invention will be described in detail with reference to the drawings.

Figure 1:
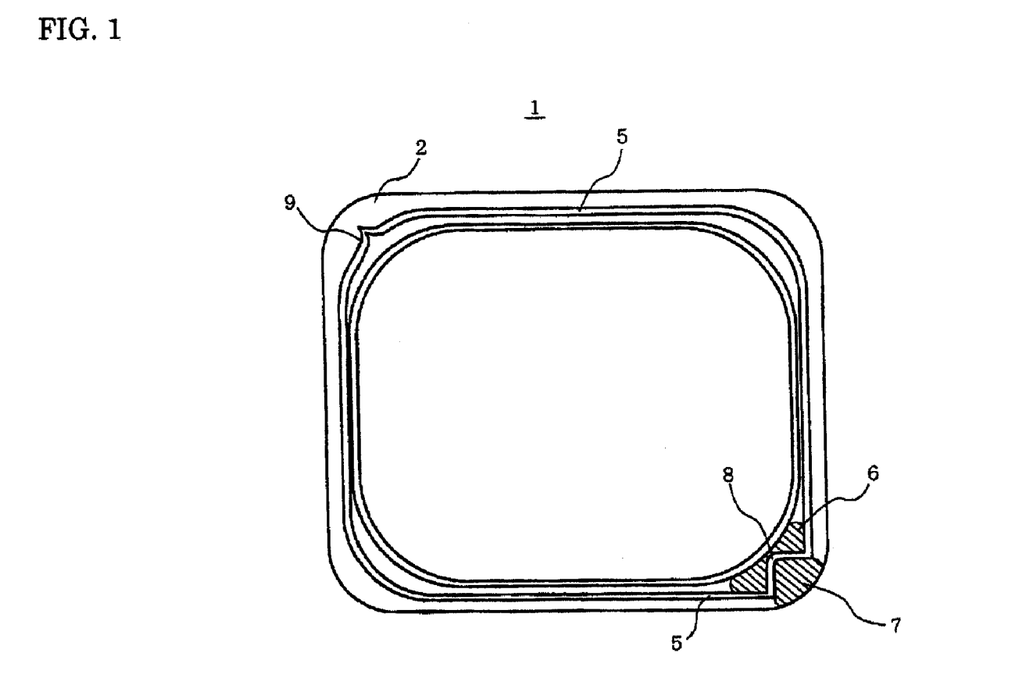
[FIG. 1] A plan view showing an example of a package for cooking in a microwave oven of the present invention.
Figure 2:
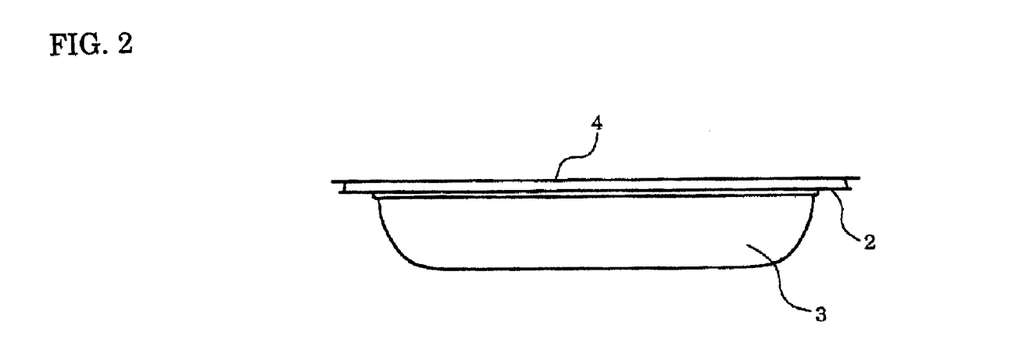
[FIG. 2] A frontal view of the package shown in FIG. 1.
Figure 3:
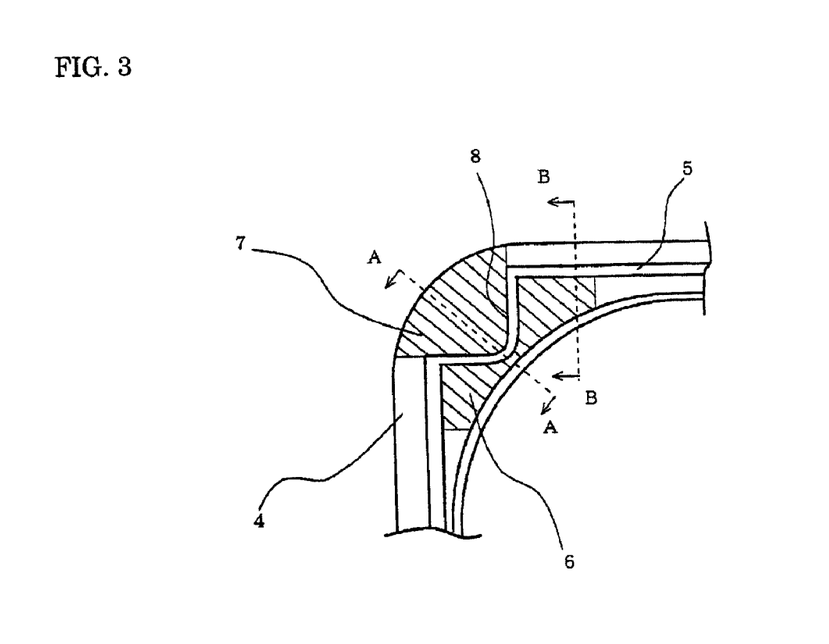
[FIG. 3] A partially enlarged view of a projection part of the package shown in FIG. 1.
Figure 4:
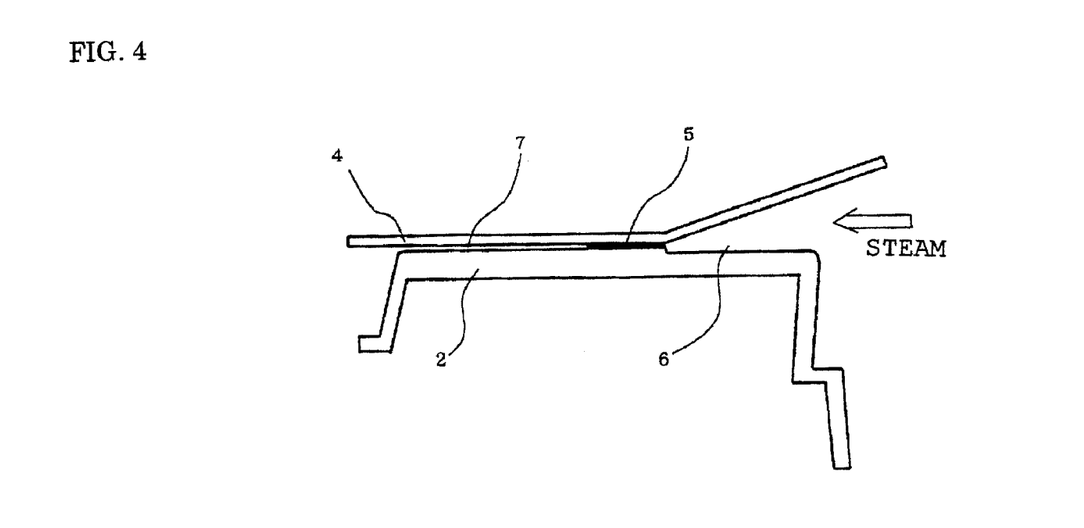
[FIG. 4] A schematic cross-sectional view when the package shown in FIG. 1 is cooked by heating in a microwave oven.
Figure 5:
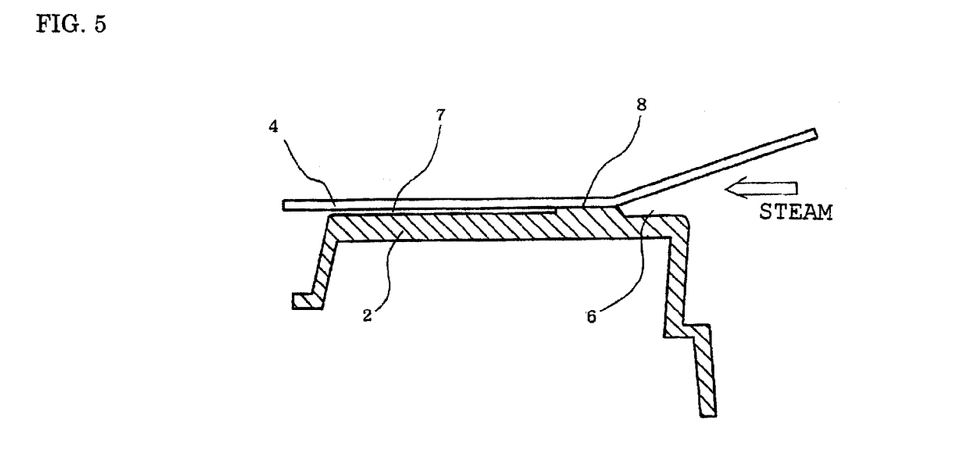
[FIG. 5] A schematic cross-sectional view when the package shown in FIG. 1 is cooked by heating in a microwave oven.
Figure 6:
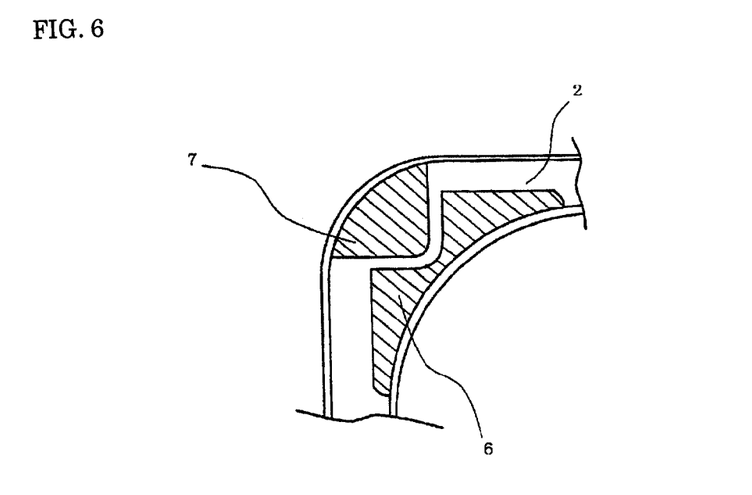
[FIG. 6] A partially enlarged view of a flange part at which the projection part is formed before a lid is heat-sealed in the package shown in FIG. 1.
Figure 7:
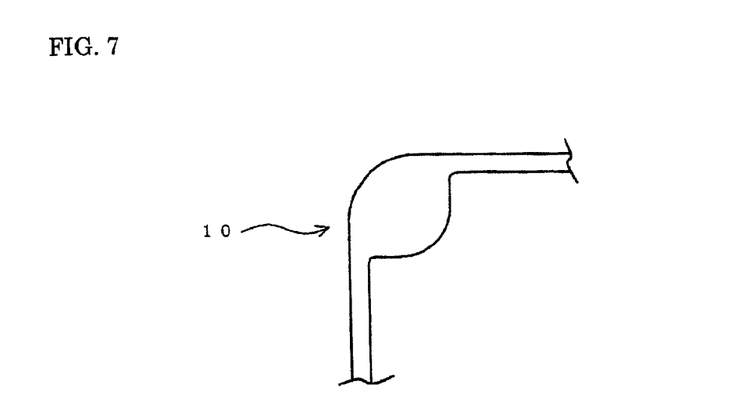
[FIG. 7] A partially enlarged view of a sealing tool used for heat-sealing the lid to the flange part.

FIGS. 1 to 7 are views showing an example of the package for cooking in a microwave oven of the present invention. FIG. 1 is a plan view of the package, FIG. 2 is a front view of the package, and FIG. 3 is a partially enlarged view of a projection part of a heat-sealed part formed at a flange part of the package. FIG. 4 is a schematic cross-sectional view taken along a line B-B in FIG. 3 when the package is cooked by heating in a microwave oven. FIG. 5 similarly shows a cross-sectional schematic view taken along a line A-A in FIG. 3. Further, FIG. 6 is a partially enlarged view of the flange part at which the projection part is formed before a lid is heat-sealed. Further, FIG. 7 is a partially enlarged view of a sealing tool used for heat-sealing the lid to the flange part.

In a package 1 for cooking in a microwave oven, a square container body 3 having a flange part 2 is filled with food (not shown) such as rice, and a lid 4 is heat-sealed to the flange part 2, whereby the package 1 is hermetically sealed.

Then, in one corner portion of the container, concave parts 6 and 7, which are independent from each other and sandwich a heat-sealed part 5, are provided on an inner side and an outer side of the heat-sealed part 5 in a portion of the flange part, whereby a projection part 8 in a V-shape directed in an inward direction of the container is formed at the heat-sealed part 5. Further, in a corner portion opposed to the projection part 8, the heat-sealed part 5 is projected in a V-shape in an outward direction of the container, whereby an opening part 9 is formed.

The projection part 8 can be formed by placing the lid 4 on the container body 3 in which the concave parts 6 and 7 are provided in a corner portion of the flange part 2 shown in FIG. 6, and heat-sealing the lid by using a sealing tool 10 shown in FIG. 7.

At this time, the lid 4 is sandwiched by a portion (to be heat-sealed) sandwiched by the concave parts 6 and 7 of the flange part and the sealing tool 10 and heat-sealed, whereby the projection part 8 is formed in the heat-sealed part 5. Thus, the projection part 8 without displacement can be formed exactly, without requiring the precise positioning when the projection part is formed, unlike a conventional package for cooking in a microwave oven.

The depth of the concave parts 6 and 7 to be provided at the flange part 2 may be the same or different. The depth of the concave part is generally set to be preferably about 0.05 to 3 mm, in particular, about 0.1 to 0.5 mm.

The seal width of the projection part 8 can be the same as or smaller than that of a peripheral heat-sealed part 5. It is preferred that the seal width be generally set to be about 0.5 to 5 mm, in particular, about 1 to 3 mm. The seal strength of the projection part 8 is preferably set to be about 5 to 30 N/15 mm. Note that the seal strength in this case means the value obtained by converting the seal width of the projection part 8 into a 15 mm width.

When the package 1 for cooking in a microwave oven is cooked by heating in a microwave oven, the inside pressure of the container increases due to the steam or the like generated from food such as rice filling the container, whereby the lid 4 expands outward. Then, at the projection part 8 provided in the corner portion, the heat-sealed part starts peeling from a tip end portion projecting in a U-shape to a V-shape in an inward direction of the container. At this time, the heat-sealed part does not peel in the other portions of the heat-sealed part 5, and the inside pressure of the container is maintained, whereby the taste of the food such as rice filling the container is improved through a sufficient steaming effect.

When the inside pressure of the container further increases, and the peeling at the tip end portion of the projection part 8 reaches the outer periphery of the heat-sealed part, the heat-sealed part opens. Then, steam with a high temperature blows out from the opened portion, and the inside pressure of the container decreases to complete cooking of the contents. The package after the completion of cooking is taken out of a microwave oven, and the lid 4 is opened with the hand from the opening part 9 provided at the corner portion opposed to the projection part 8, whereby the food can be eaten as it is. At this time, although the steam with a high temperature blows out from the opened projection part 8, the steam blows out toward the opposite direction of the opening part 9, so that the lid 4 can be opened safely. Further, while the heat-sealed part automatically opens at the projection part 8, and thereafter, the inside pressure decreases, the inside pressure in the container can be maintained to some degree, so that the contents can be provided with a sufficient steaming effect.

Figure 8:
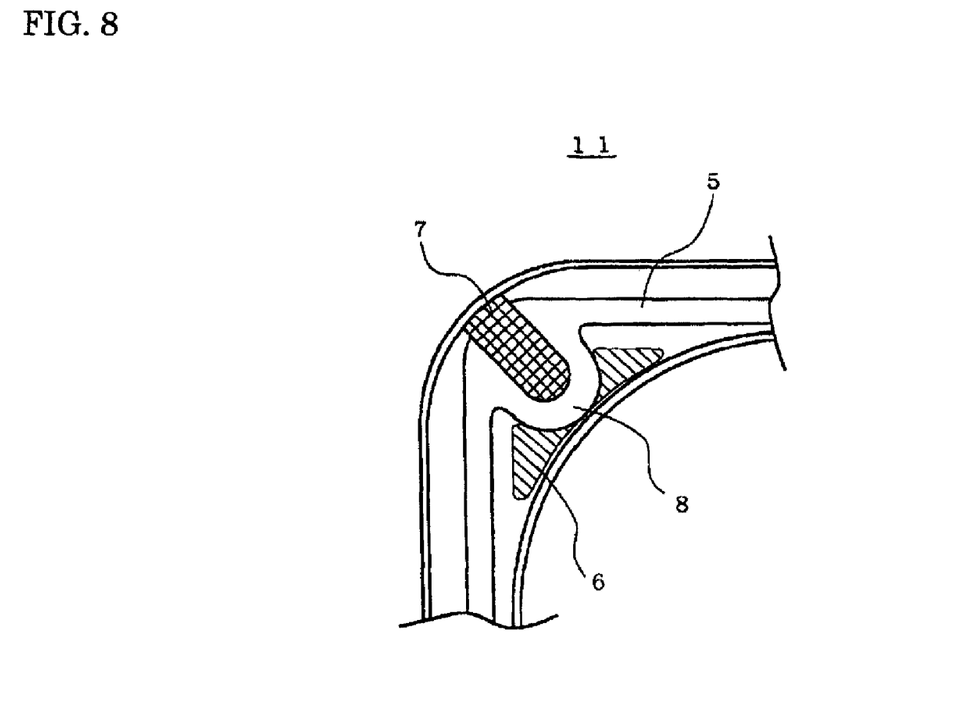
[FIG. 8] A partially enlarged view of the projection part showing another example of the package for cooking in a microwave oven of the present invention.

FIG. 8 is a partially enlarged view of the corner portion, showing another example of the package for cooking in a microwave oven of the present invention.

In a package 11 for cooking in a microwave oven, the concave parts 6 and 7 in the shown shape are provided so as to sandwich the heat-sealed part 5 at the corner portion of the flange part, whereby the U-shaped projection part 8 directed in an inward direction of the container is formed. The other configuration of the package 11 is the same as that of the package 1 shown in FIG. 1.

Figure 9:
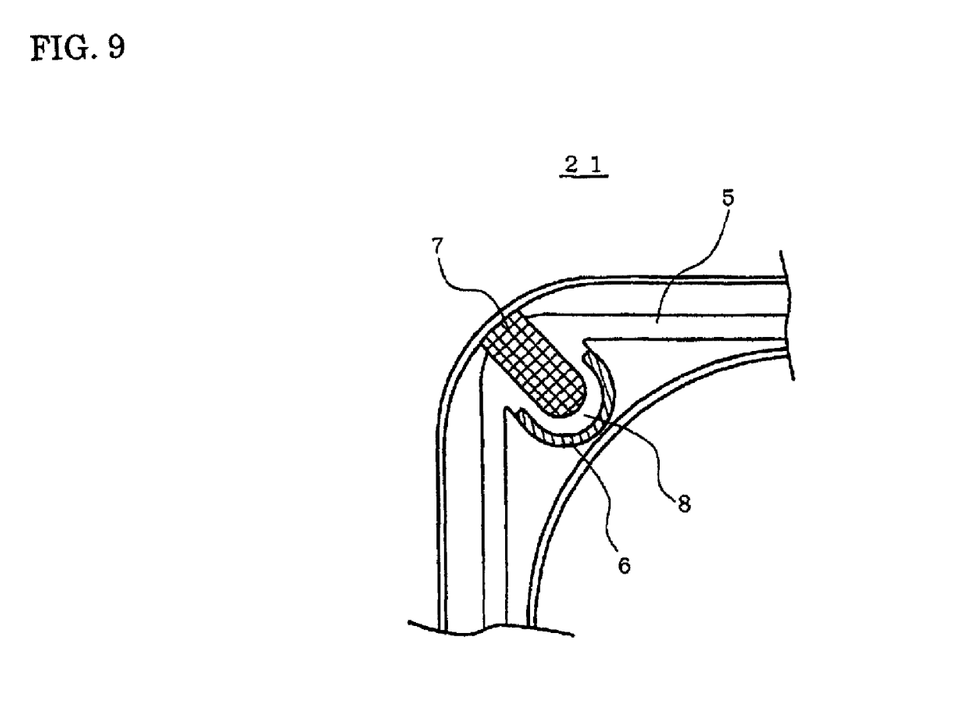
[FIG. 9] A partially enlarged view of the projection part showing another example of the package for cooking in a microwave oven of the present invention.

FIG. 9 is a partially enlarged view of the corner portion, showing another example of the package for cooking in a microwave oven of the present invention.

In a package 21 for cooking in a microwave oven, the concave parts 6 and 7 in the shown shape are provided so as to sandwich the heat-sealed part 5 at the corner portion of the flange part, whereby the U-shaped projection part 8 directed in an inward direction of the container is formed. The other configuration of the package 21 is the same as that of the package 1 shown in FIG. 1.

Figure 10:
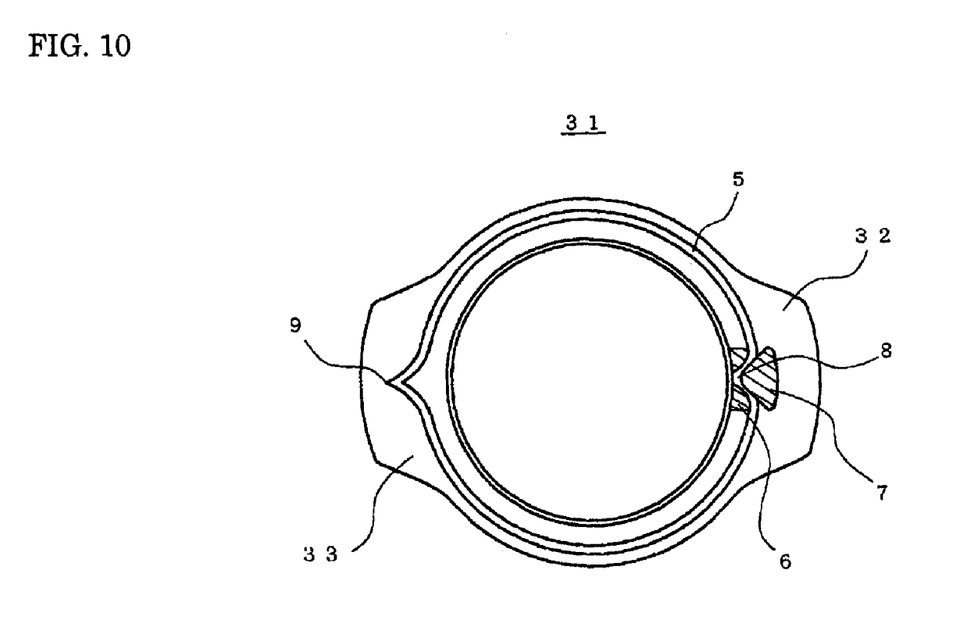
[FIG. 10] A plan view showing another example of the package for cooking in a microwave oven of the present invention.
Figure 11:
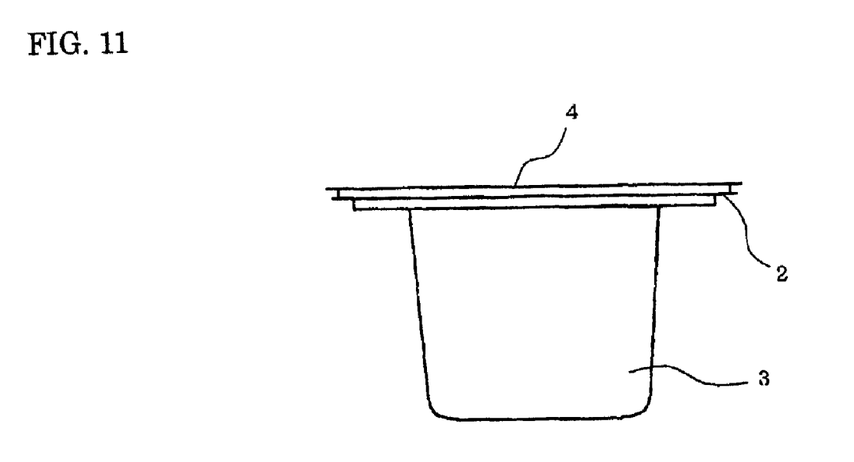
[FIG. 11] A front view of the package shown in FIG. 10.

FIGS. 10 and 11 are views showing another example of the package for cooking in a microwave oven of the present invention.

FIG. 10 is a plan view of the package, and FIG. 11 is a front view of the package.

In a package 31 for cooking in a microwave oven, a cup-shaped container body 3 with a circular horizontal cross-section having the flange part 2 is filled with food (not shown) such as rice, and the lid 4 is heat-sealed to the flange part 2, whereby the package 31 is hermetically sealed. The flange part 2 is provided with a pair of wide parts 32, 33 at positions opposed with each other. Then, the concave parts 6 and 7 are provided at one wide part 32 with the heat-sealed part 5 interposed therebetween, whereby the projection part 8 in a V-shape directed in an inward direction of the container is formed at the heat-sealed part 5.

Further, in the opposed wide part 33, the heat-sealed part 5 is projected in a V-shape in an outward direction of the container to form the opening part 9.

In each of the above-mentioned examples, the package for cooking in a microwave oven, in which the shape of a container body is square or cup-shaped, has been described. However, the shape of the container body or the lid can be changed appropriately, for example, changed into an elliptical shape. Further, needless to say, the size thereof can be set arbitrarily.

The container body and the lid can be manufactured by a common method. For example, as a forming method of the container body, vacuum forming, pressure forming, vacuum pressure forming, or injection molding may be used.

EXAMPLES

In the following, the following examples are provided for the purpose of further illustrating a package for a microwave oven of the present invention, but the present invention is not limited to the examples.

Example 1

A multi-layered sheet with a total thickness of 0.8 mm was manufactured by ordinary co-extrusion molding with a 3-kind and 5-layer constitution including: in the stated order from the outer layer, a polypropylene resin outer layer (thickness: 350 μm) with a titanium white pigment added to polypropylene having a melt index (MI) of 0.5; an adhesive layer (thickness: 20 μm) made of maleic anhydride modified polypropylene; a barrier layer (thickness: 60 μm) made of an ethylene-vinyl alcohol copolymer; the same adhesive layer as that described above (thickness: 20 μm); and a polypropylene resin inner layer with MI=0.5 (thickness: 350 μm).

Using the multi-layered sheet, a square container with a flange (flange width: 8 mm in a linear portion, maximum width of 17 mm in a corner portion) having the shape shown in FIG. 1 with a container outer size of 156 mm×133 mm and a height of 29 mm (inner capacity: about 340 ml) was formed by an ordinary vacuum/pressure forming machine. In the flange part 2 in the corner portion of the container, the concave parts 6 and 7 independent from each other with a depth of 0.3 mm were formed on an inner side and an outer side during forming of the container so as to sandwich a portion corresponding to a part to be heat-sealed to the lid.

On the other hand, a laminate constituting a lid was formed by dry lamination in the following procedure, using a biaxially oriented polyester film (outer layer) with a thickness of 12 μm, a biaxially oriented nylon film (intermediate layer) with a thickness of 15 μm, and a polypropylene-based film (inner layer) made of an ethylene/propylene-based complex material with a thickness of 50 μm, with a polyurethane-based adhesive placed between the respective resin layers.

First, an adhesive was applied to an outer layer material with a gravure roll or the like, and a solvent was evaporated and dried in a dry oven at a temperature of 80 to 100° C. Next, an adhesive layer in an adhesive state and an intermediate layer material were attached, and crimped by heated metal roll and rubber roll, and thereafter, the resultant is passed through a cooling metal roll to be wound up. In a similar procedure, the inner layer material was attached to the laminate and cut into a desired size to constitute the lid.

Using a sterile packaging filling line, the above-mentioned container was filled with 200 g of sterile rice, and thereafter, the lid 4 was heat-sealed to the flange part 2 of the container to seal hermetically, whereby the peripheral sealed part 5 with a seal width of 2 m and the V-shaped projection part 8 projecting inward by about 5 mm from the peripheral sealed part 5 were formed.

Further, in another corner portion, as shown in FIG. 1, the peripheral sealed part 5 was projected in an outward direction of the container to provide a V-shaped angular portion, and the opening part 9 was formed to obtain a package for cooking in a microwave oven.

Example 2

A square container was formed in the same way as in Example 1, except that the depth of the concave parts 6 and 7 formed at the flange part in the corner portion of the container was set to be 0.5 mm.

The packaging container shown in FIG. 1 was manufactured in the same way as in Example 1 and similarly filled with 200 g of sterile rice, followed by sealing hermetically, whereby a package for cooking in a microwave oven was obtained.

Example 3

In Example 1, the concave parts 6 and 7 independent from each other with a depth of 0.2 mm were formed on an inner side and an outer side during forming of the container so as to sandwich a portion corresponding to the heat-sealed part 5 in two positions of the flange part in the corner portion of the container.

The packaging container shown in FIG. 1 was manufactured in the same way as in Example 1 and similarly filled with 200 g of sterile rice, followed by sealing hermetically, whereby a package for cooking in a microwave oven was obtained.

Comparative Example 1

In Example 1, a V-shaped projection part directed in an inward direction of the container was formed at a flat flange part without forming the concave parts 6 and 7 at the flange part in the corner portion of the container, whereby a square container with a flange having the shape shown in FIG. 1 was formed.

The packaging container was manufactured in the same way as in Example 1 and similarly filled with 200 g of sterile rice, followed by sealing hermetically, whereby a package for cooking in a microwave oven was obtained.

Table 1 shows the results obtained by heating/cooking each set of 20 packages filled with sterile rice and sealed hermetically obtained in the above-mentioned respective examples in a 600 w microwave oven. Table 1 also shows the number of damaged packages obtained by dropping each set of 10 packages in an inverted manner from the height of 80 cm at 5° C. and checking the presence/absence of damages in the sealed part.

Regarding these containers, the seal strength (average value) measured from inside of the container of the peripheral seal part 5 by the following method was 11 N/15 mm in any of the containers, and the opening strength (average value) measured from outside of the sealed part 10 for opening was 15.0 N/cup in any of the containers.

(Seal Strength)

The container was fixed to a container holder, and a lid was cut to a width of 15 mm at both sides of a sealed part. The lid on an inner side portion of the container was fixed to a chuck of a tensile tester and pulled upward in a direction of 90° at 300 mm/min. to measure a maximum load.

(Opening Strength)

The container was fixed to a container holder with a sealed surface of the container tilted at 45°. Then, a lid at an outside projection part corresponding to the opening part was fixed to a chuck and pulled upward at the same speed as that described above to measure maximum load.

TABLE 1

| | Heating test by microwave oven | | | | |
|---|---|---|---|---|---|
| | Steam releasing position and state | | | | |
| | Projection part for steam releasing | Parts other than projection part for steam releasing | Steam releasing state | Container deformation | Number of damages in drop test |
| Example 1 | 20 | 0 | Steam released smoothly | Small | 0 |
| Example 2 | 20 | 0 | Steam released smoothly | Small | 0 |
| Example 3 | 20 | 0 | Steam released smoothly from one projection part | Small | 0 |

TABLE 1-continued

| | Heating test by microwave oven | | | | |
|---|---|---|---|---|---|
| | Steam releasing position and state | | | | |
| | Projection part for steam releasing | Parts other than projection part for steam releasing | Steam releasing state | Container deformation | Number of damages in drop test |
| Comparative Example 1 | 18 | 2 | Steam released from part other than projection part, Steam released before a predetermined time | Large | 1 |

As shown in Table 1, when the concave part is formed in the flange corner portion of the container of the present invention, and the projection part projecting inward is provided at the heal-sealed part, there is less positional variation of the projection part to be a steam releasing part. Further, the projection part gradually retracted along with the increase in inside pressure due to the heating in a microwave oven, and steam was released very smoothly and exactly. At this time, the deformation of the container was suppressed to be small. Further, the sealed part was not damaged even in the drop test.

Further, compared with a conventional product that is heated in a microwave oven after a lid is peeled, the sealing performance can be maintained until the steam was released, so that the taste of rice was enhanced through a steaming effect.

On the other hand, when the concave part was not formed in the flange portion of the container, and the projection part projecting inward was provided at the heat-sealed part, there was a large variation in the steam releasing position. Consequently, steam was also released from the position other than the projection part to blow out due to the heating of the package in a microwave oven, and steam was released before a predetermined time to decrease the steaming effect. Further, there was also a damage from the sealed part in some cases even in the drop test.

The invention claimed is:

1. A package for cooking in a microwave oven, in which a container body made of a synthetic resin and having a flange part is filled with contents, and a lid is heat-sealed to the flange part to seal the package hermetically via a heat-sealed part, wherein individual concave parts are provided only in a portion of the flange part to be opened automatically when the package is heated in a microwave oven, and wherein the respective individual concave parts are located on an inner side and an outer side of the heat-sealed part, opposite one another, thereby forming a projection part directed in an inward direction of a container at the heat-sealed part, and wherein the lid is heat-sealed to a flat surface of the flange other than the projection part.

2. A package for cooking in a microwave oven according to claim 1, wherein an opening part projecting in an outward direction of the container is formed at a position opposed to the projection part of the heat-sealed part of the package for cooking in a microwave oven.

3. A package for cooking in a microwave oven according to claim 2, wherein the container body made of a synthetic resin is a square container, and the projection part and an opening part are formed respectively in corner portions opposed to each other in the container.

4. A package for cooking in a microwave oven according to claim 2, wherein the opening part is formed in a V-shape.

5. A package for cooking in a microwave oven according to claim 1, wherein the projection part is formed in a U-shape or a V-shape.

6. A package for cooking in a microwave oven according to claim 1, wherein a seal strength at the projection part formed at the heat-sealed part is 5 to 30 N/15 mm.

7. A package for cooking in a microwave oven according to claim 1, wherein depths of the concave parts at both sides of the projection part are 0.05 to 3 mm.

8. A package for cooking in a microwave oven according to claim 1, wherein a width of the heat-sealed part at the projection part is 0.5 to 5 mm.

9. A package for cooking in a microwave oven according to claim 1, wherein the concave parts define the outline of the projection part.

* * * * *